Patented Apr. 9, 1946

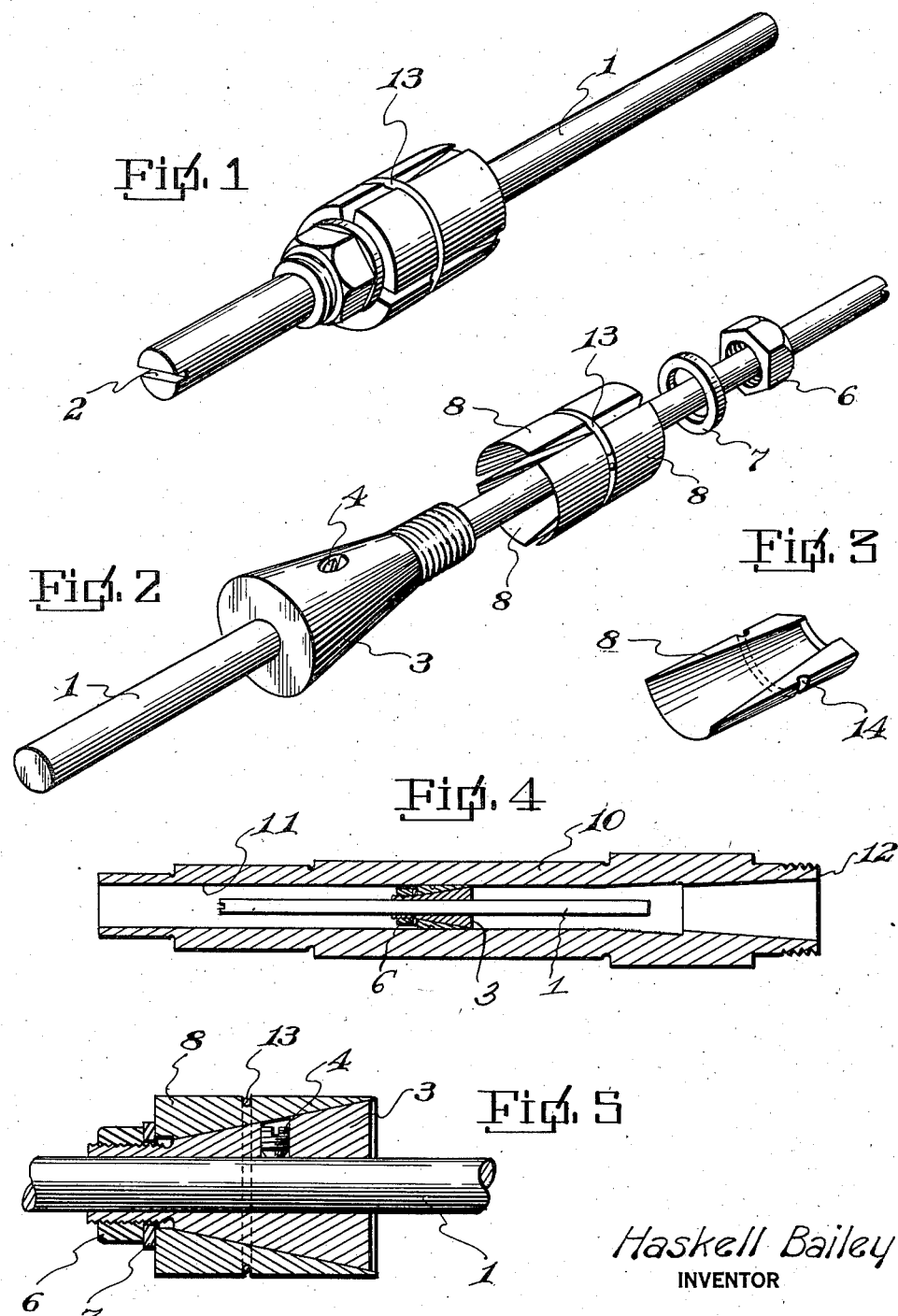

2,398,278

UNITED STATES PATENT OFFICE 2,398,278

ADJUSTABLE STOP FOR LATHE SPINDLES

Haskell Bailey, Tulsa, Okla.

Application April 27, 1944, Serial No. 532,973

1 Claim. (Cl. 82—34)

The invention relates to an adjustable stop adapted to be placed in a lathe spindle so that succeeding work pieces may be quickly placed in the spindle without the necessity of adjusting each work piece. Usually the work pieces are of the same length.

A further object is to provide a lathe spindle stop comprising an elongated mandrel axially disposed within the lathe spindle, and held in adjusted position by an expansible member.

A further object is to provide the mandrel with a tapered sleeve or cone in which the mandrel is secured and a plurality of tapered segments around the cone and adapted to be expanded outwardly into engagement with the periphery of the bore through the spindle for rigidly holding the mandrel in adjusted position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the stop.

Figure 2 is a view similar to Figure 1 but showing the parts partially disassembled.

Figure 3 is a perspective view of one of the tapered segments.

Figure 4 is a vertical longitudinal sectional view through a conventional form of lathe spindle, showing the adjustable stop therein.

Figure 5 is a vertical longitudinal sectional view through the expansible holding means for the stop.

Referring to the drawing, the numeral 1 designates the elongated stop, one end of which is preferably provided with a transverse slot 2 so that the member 1 can be held during the adjusting and tightening operation. Longitudinally slidable on the stop 1 is a cone 3 which is held in adjusted position by means of a set screw 4. The small end of the cone 3 terminates in a threaded portion 5 for the reception of the expanding nut 6. The nut 6 acts against a washer 7, which washer engages the enlarged ends of the tapered expansion segments 8 between which segments the cone 3 passes, therefore it will be seen that after the assembled device is passed into the bore 9 of the spindle 10 through the rear end 11 of the bore that the stop 10 can be properly adjusted, and the operator can pass a special wrench into the bore 9 for cooperating with the expanding nut 6 for expanding the segments 8 outwardly into binding engagement with the bore periphery, hence the stop 10 is positively held against axial displacement and successive work pieces of similar length will project the same distance beyond the forward end 12 of the spindle, therefore it will not be necessary to adjust the various cutters of the lathe for similar work on successive work pieces.

The segments 8 are held in relative relation by a split spring ring 13 which ring is disposed in grooves 14 in the segments 8, and during an expanding operation, the spring ring 13 is expanded, and when the nut 6 is loosened the spring ring 13 will contract or pull the segments 8 inwardly for disengagement from the periphery of the spindle bore 9.

From the above it will be seen that an adjustable stop is provided which is particularly adapted for use in connection with lathe spindles, collets and the like, and one which may be easily and quickly applied and adjusted so that successive elements may be placed in the lathe spindle without further adjustment.

The invention having been set forth what is claimed as new and useful is:

A work stop adapted to be disposed within a cylindrical bore of a lathe spindle, said stop comprising an elongated rod axially disposed within the bore, a cone member longitudinally adjustable on the rod, a radial set screw carried by said cone member and disposed within the lines of said cone member, an expansible segmental bore gripping member surrounding the cone member and formed from independent segments, said expansible bore member having a cone shaped bore engaging the periphery of the adjustable cone member, a spring surrounding said expansible member in a channel thereof, said expansible member having its tapered bore in reverse relation to the first mentioned tapered member, said first mentioned tapered member having a threaded extension extending beyond the end of the expansible member and a lock nut carried by said threaded extension and cooperating with the segments of the expansible member for forcing said segments simultaneously towards the tapered member for expanding the expansible member.

HASKELL BAILEY.